(12) United States Patent
Lowenberg et al.

(10) Patent No.: US 11,878,815 B2
(45) Date of Patent: Jan. 23, 2024

(54) UNMANNED AERIAL VEHICLE SELF-CENTERING AND CAPTURE SYSTEM AND RELATED METHODS

(71) Applicant: Naval Information Warfare Center, Pacific, San Diego, CA (US)

(72) Inventors: Lance Von Lowenberg, San Diego, CA (US); Michael Tall, San Diego, CA (US); Michael Ouimet, San Diego, CA (US); Anthony D. Jones, San Diego, CA (US)

(73) Assignee: United States of America as represented by the Secretary of the Navy, Washington, DC (US)

(*) Notice: Subject to any disclaimer, the term of this patent is extended or adjusted under 35 U.S.C. 154(b) by 84 days.

(21) Appl. No.: 17/507,576

(22) Filed: Oct. 21, 2021

(65) Prior Publication Data
US 2023/0131957 A1  Apr. 27, 2023

(51) Int. Cl.
| | | |
|---|---|---|
| *B64F 1/00* | (2006.01) |
| *B64U 70/93* | (2023.01) |
| *B64U 70/99* | (2023.01) |
| *B64C 39/02* | (2023.01) |
| *B64U 10/13* | (2023.01) |
| *B64U 50/19* | (2023.01) |
| *B64U 101/60* | (2023.01) |

(52) U.S. Cl.
CPC .............. *B64F 1/007* (2013.01); *B64U 70/93* (2023.01); *B64U 70/99* (2023.01); *B64C 39/024* (2013.01); *B64U 10/13* (2023.01); *B64U 50/19* (2023.01); *B64U 2101/60* (2023.01)

(58) Field of Classification Search
CPC .......... B64F 1/007; B64U 70/93; B64U 70/99
See application file for complete search history.

(56) References Cited

U.S. PATENT DOCUMENTS

| | | | |
|---|---|---|---|
| 2006/0175466 A1* | 8/2006 | Snediker | B64F 1/029 244/110 G |
| 2008/0191091 A1* | 8/2008 | Hoisington | B64F 1/027 244/110 F |
| 2017/0137150 A1* | 5/2017 | Conyers | B64F 1/007 |
| 2017/0197725 A1* | 7/2017 | Foo | B64C 39/024 |
| 2018/0079531 A1* | 3/2018 | Bennett | B64F 1/007 |
| 2018/0257502 A1* | 9/2018 | Park | H02J 50/10 |
| 2021/0047053 A1* | 2/2021 | Sugimoto | B64F 1/22 |
| 2021/0269174 A1* | 9/2021 | Shuff | G08G 5/0069 |
| 2022/0073214 A1* | 3/2022 | Liske | B64F 1/32 |
| 2022/0306320 A1* | 9/2022 | Howe | B64U 10/13 |

* cited by examiner

*Primary Examiner* — Jessica B Wong
(74) *Attorney, Agent, or Firm* — Naval Information Warfare Center, Pacific; Kyle Eppele; Matthew D. Pangallo (57) ABSTRACT

The present invention relates to a system that can to capture, retain, and release a small UAV/drone. Exemplary embodiments include a plurality of capture mechanisms each include a capture arm coupled to an actuator. The capture mechanism can include two pivot points, one of which can move along a track or groove, to allow the capture arm to extend and retract while maintaining a small combined circumference during UAV landing while still being able to extend to engage with a retention ring on the UAV.

11 Claims, 9 Drawing Sheets

Step 1001: providing a capture system comprising capture platform and a plurality of capture mechanisms each comprising a capture arm Step 1003: providing a UAV comprising a retention ring Step 1005: moving the UAV over the capture system Step 1007: lowering the UAV to a height above the capture system approximately equal to the length of the capture arms of the plurality of capture mechanisms Step 1009: extending the capture arms of the plurality of capture mechanisms such that the capture arms hold the retention ring between the captures arms and the capture platform

Fig. 10

UNMANNED AERIAL VEHICLE SELF-CENTERING AND CAPTURE SYSTEM AND RELATED METHODS

STATEMENT REGARDING FEDERALLY SPONSORED RESEARCH OR DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 111,333.

BACKGROUND OF THE INVENTION

The present invention relates to a system for capturing, retaining, and releasing a unmanned aerial vehicle (UAV). The ability to launch small unmanned aircraft autonomously from larger unmanned platforms is a growing area of interest. Manned aerial vehicles are secured prior to and after flight to ensure the safety of the both aircraft and landing area and allow for refueling, data transfer, and other functions; similar restraints will be required to secure unmanned aerial systems to the platforms they are launched and recovered from. As it is possible and potentially beneficial to launch said systems from other unmanned platforms, there is need for an autonomous system which can recover, secure, recharge, and release them pre and post flight.

SUMMARY OF THE INVENTION

According to an illustrative embodiment of the present disclosure, a plurality of capture mechanisms can be used to capture, retain, and release a small UAV/drone. The system is primarily designed for use on a moving landing platform. The capabilities of the system allow for a small UAV to be captured upon landing and subsequently released for takeoff, mitigating the risk of misalignment on or falling from the landing platform when the platform is in motion as well as facilitating inductive or contact recharging on the platform, which requires precision alignment.

According to a further illustrative embodiment of the present disclosure, a plurality of capture mechanisms each include a capture arm coupled to an actuator. The capture mechanism can include two swivel points, one of which can move along a groove, to allow the capture arm to extend and retract while maintaining a small combined circumference during UAV landing while still being able to extend to engage with a retention ring on the UAV.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE INVENTION

The embodiments of the invention described herein are not intended to be exhaustive or to limit the invention to precise forms disclosed. Rather, the embodiments selected for description have been chosen to enable one skilled in the art to practice the invention.

Figure 1:
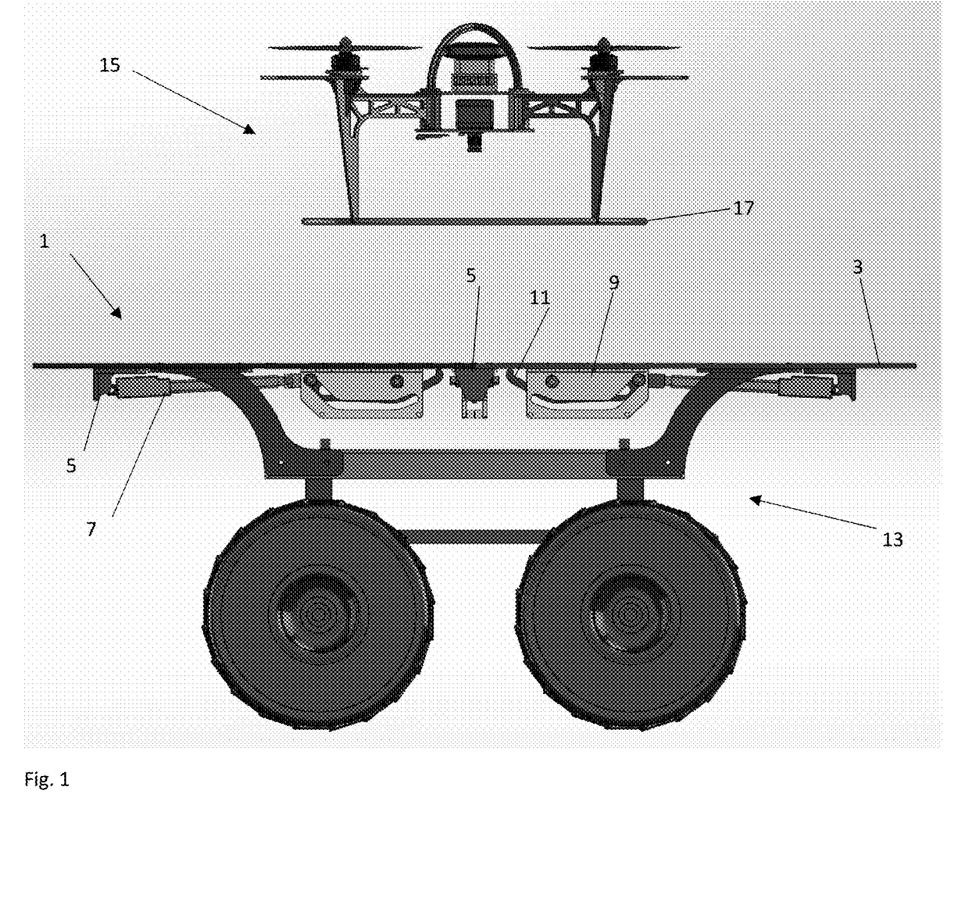
FIGS. 1-5 show an exemplary UAV capture system at various stages of UAV capture.

FIG. 1 shows an exemplary UAV capture system 1 with capture arms 11 fully retracted. A plurality of actuator brackets 5 and corresponding capture arm supports 9 are coupled to landing platform 3. A corresponding plurality of actuators 7 are coupled to actuator brackets 5 and capture arm supports 9. A corresponding plurality of capture arms 11 are coupled to actuators 7 and capture arm supports 9. Landing platform 3 can be coupled to any type of platform support 13, such as a stationary platform (e.g., support pillars), a vehicular platform (e.g., a mobile, self-driving platform), or any of kind of platform (e.g., nautical buoy, etc.). Exemplary embodiments include two, three, or four sets of capture mechanisms. Larger numbers of capture mechanisms can be used but with greatly diminishing returns. As few as two capture mechanisms can be used, but this can result in reduced stability when retaining a captured UAV, and centering the UAV becomes more difficult. Three capture mechanisms can be used to avoid these disadvantages, but the mismatch between three capture mechanisms and landing struts can cause problems during capture and retention. UAVs generally have four landing struts, so using four capture mechanisms allows the mechanisms to be equally spaced between the landing struts. Using four capture mechanisms also provides redundancy in case one of the capture mechanisms fails. Losing one of three capture mechanisms would likely cause a loss of functionality, but losing one of four capture mechanisms would not.

UAV system 15 includes a retention ring 17. Using a retention ring 17 that doesn't exceed the UAV's dimensions will improve the UAV's aerodynamics. Maximizing the retention ring 17 diameter improves the ability for the UAV to land with the capture arms inside the retention ring. Retention ring 17 can have a diameter matching the UAV's landing gear to minimize weight added by the retention ring. As a result, the best trade-off is usually a circular retention ring 17 that matches the UAV's landing gear. For embodiments that use only two capture mechanisms, an elliptical retention ring may be preferred so that the capture arms will center the UAV based on the retention ring's axes.

Figure 2:
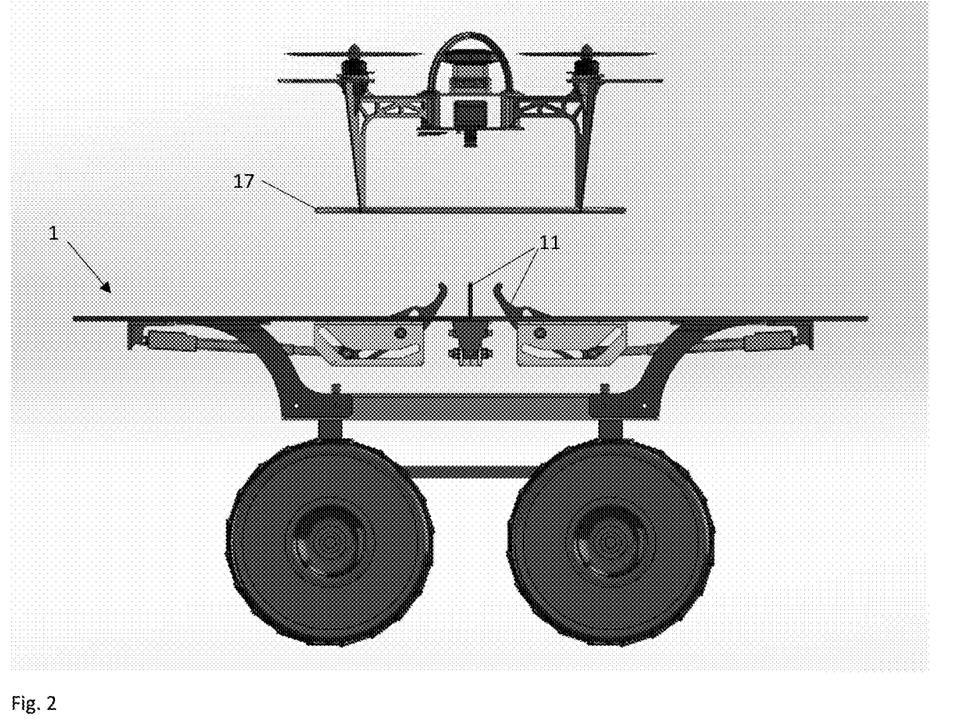

FIG. 2 shows an exemplary UAV capture system 1 with capture arms 11 partially extended. The capture mechanisms can be position such that when capture arms extend, they form a circle with a minimally small diameter. Smaller capture arm diameters, in relation to the diameter of retention ring 17, makes it easier for retention ring 17 to land on the platform with capture arms 11 positioned within retention ring 17. In contrast, shorter capture arms can be used forming larger capture arm diameter, but a UAV that lands with retention ring 17 inside of the capture arm diameter will not be captured by the system.

Figure 3:
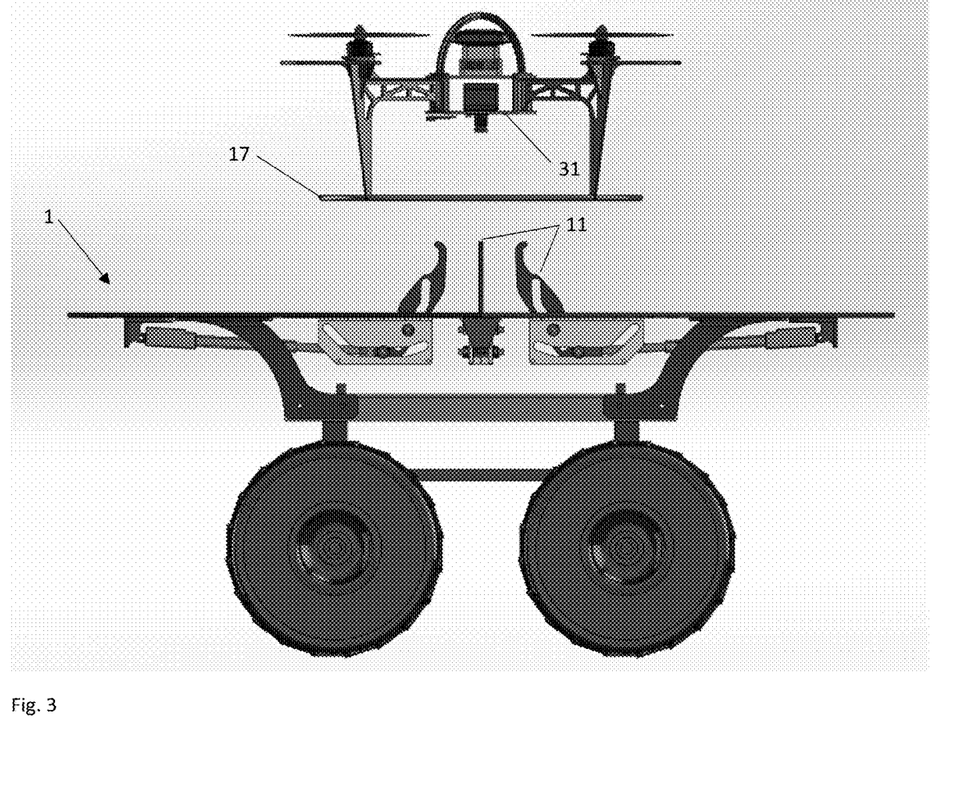

FIG. 3 shows an exemplary UAV capture system 1 with capture arms 11 vertically extended. The distance between retention ring 17 and the UAV body 31 can be sufficiently long such that when the UAV is on the platform, the fully extended capture arms 11 will not touch the UAV body 31.

Figure 4:
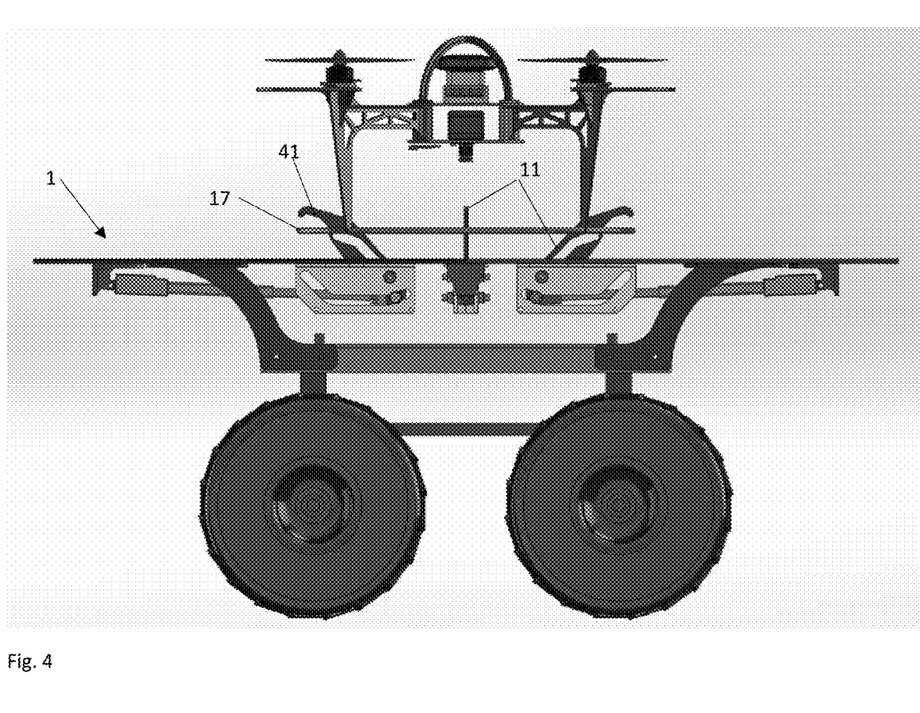

FIG. 4 shows an exemplary UAV capture system 1 with capture arms 11 partially enclosing retention ring 17. Capture arms 11 can be formed with a nook 41 such that the capture arms can lay flush with the landing platform with retention ring 17 held firmly between capture arms 11 and the landing platform. As the capture arms 11 extend, at least one capture arm will contact the retention ring 17. As the capture arms continue to extend, the friction between the capture arms 11 and retention ring 17 will pull the UAV down and any remaining capture arms will contact the retention ring. Further extension of the capture arms 11 center and orient the UAV as the UAV continues to land. The shape of nook/recess 41 is configured to hook retention ring 17 so that the ring can move without detaching from the capture arms as the UAV lands.

Figure 5:
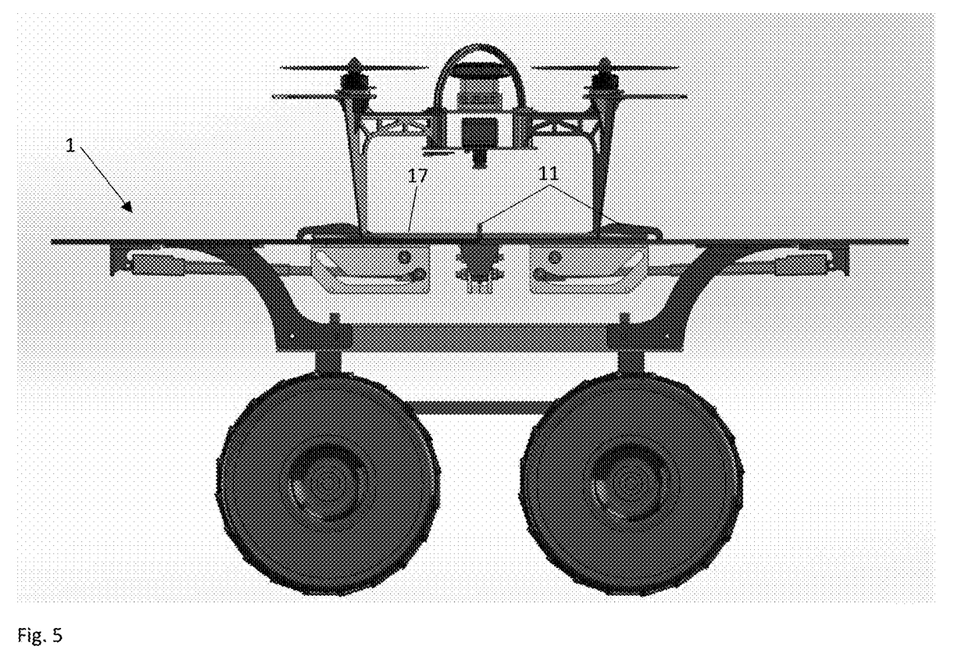

FIG. 5 shows an exemplary UAV capture system 1 with capture arms 11 fully enclosing retention ring 17. The symmetrical lowering of capture arms 11 centers the UAV onto the landing platform.

Figure 6:
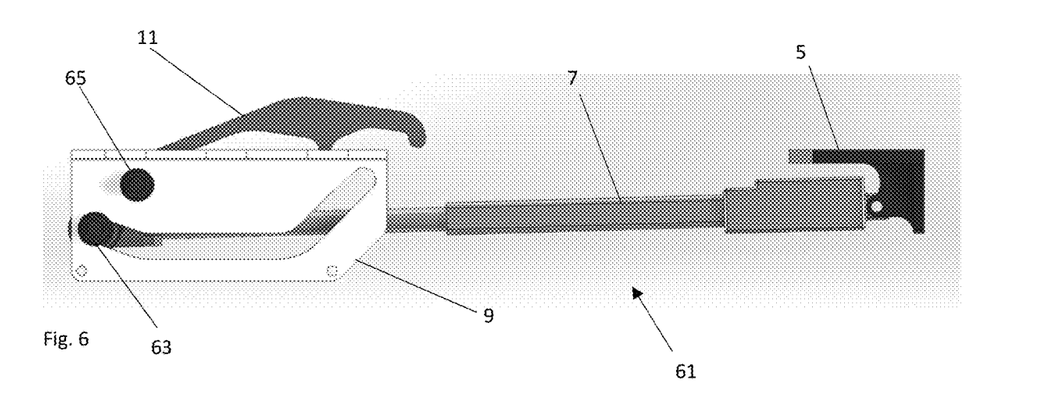
FIG. 6 shows an exemplary capture mechanism.

FIG. 6 shows an exemplary capture mechanism 61. Capture arm 11 is coupled to capture arm support 9 at a first and second pivot point 63, 65. First pivot point 63 is disposed within a track formed in capture arm support 9 to allow the first pivot point to move along the track as actuator 7 extends and retracts. Second pivot point 65 disposed within an aperture of capture arm support 9 such that the second pivot point remains stationary. The combination of first and second pivot points enables the capture arms to the form a small diameter while maximizing the length of the capture arms to increase the likelihood that a retention ring will envelop the capture arms.

Figure 7:
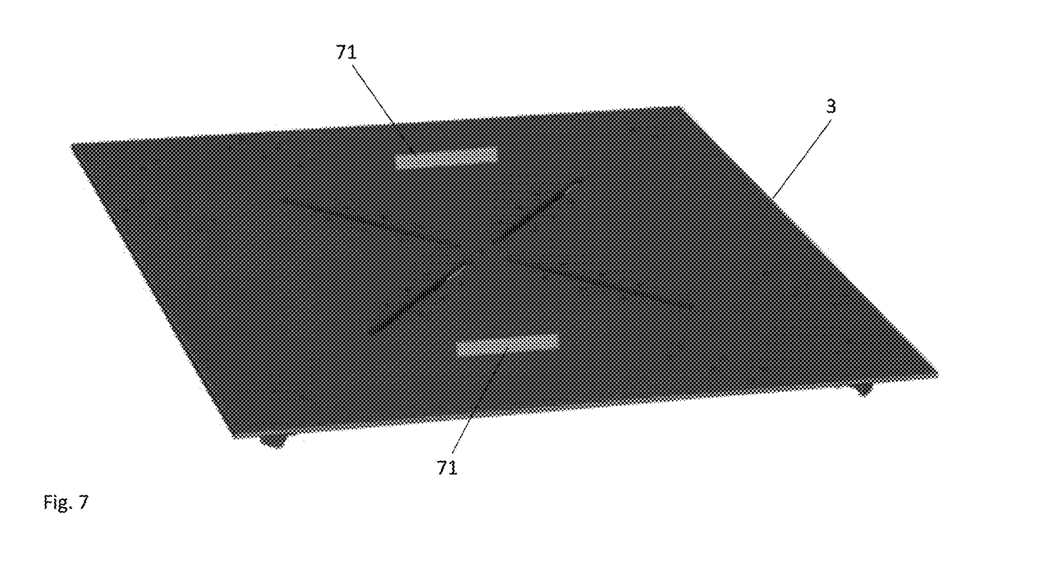
FIG. 7 shows an exemplary landing platform.

FIG. 7 shows an exemplary landing platform 3. Landing platform 3 can include a variety of attachments 71 (e.g., sensors, power transfer conduits, transceivers, etc.). Attachments 71 can be placed to align with components of a captured UAV. In an exemplary embodiment, a camera attachment can be used to detect a landing UAV and activate the actuators to capture the UAV. In an exemplary embodiment, a conductive power transfer attachment can be placed such that the attachment aligns with a corresponding power transfer module on a UAV to recharge the UAV's batteries. In an exemplary embodiment, transceiver attachments can send and receive information from UAVs, including a landing signal that will activate the actuators.

Figure 8:
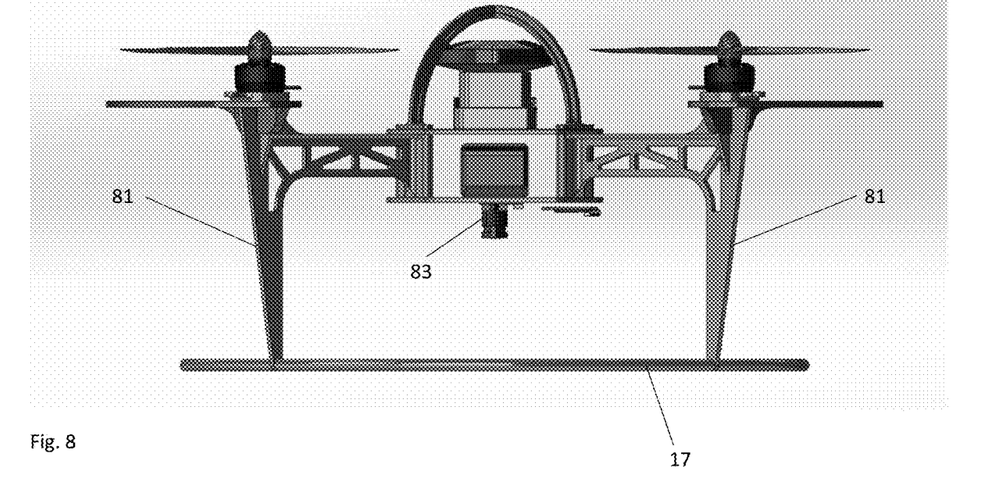
FIG. 8 shows an exemplary UAV system.

FIG. 8 shows an exemplary UAV system 15. Landing struts 81 can be used to mount retention ring 17. The height of the struts should be used to determine the length of the capture arms (as shown in FIG. 3) so that the capture arms can't hit the UAV during extension, preventing accidental damage to UAV components. A UAV can include electronics 83 to aid in landing and capture. In an exemplary embodiment, electronics 83 include a sensor that can measure the height of the UAV above a landing platform and a transceiver that can send a capture signal to the landing platform once the UAV reaches a predetermined height. Upon receiving the capture signal, the actuators will activate. In an exemplary embodiment, a sensor in electronics 83 can also activate wireless power transfer of the capture system to recharge the UAV system.

Figure 9:
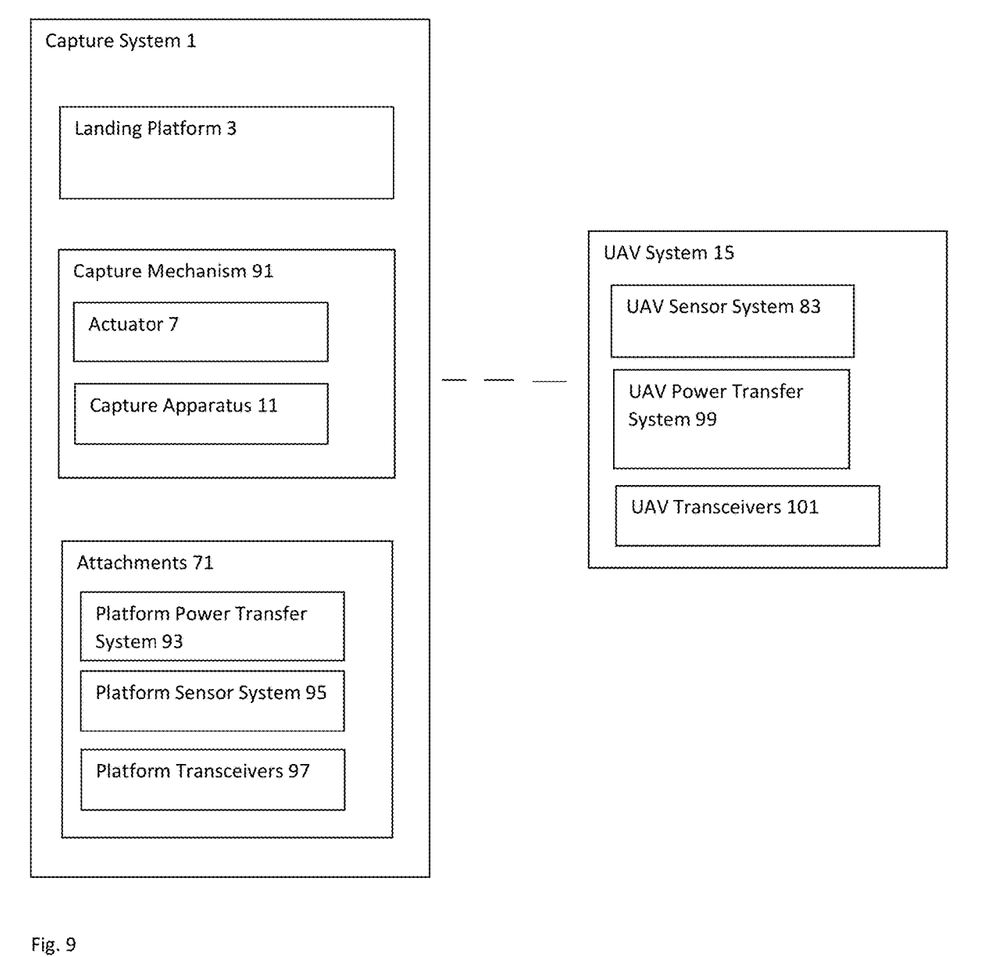
FIG. 9 shows a block diagram of an exemplary UAV capture system.

FIG. 9 shows a block diagram of an exemplary UAV capture system 1 and UAV system 15. UAV capture system 1 can include landing platform 3, capture mechanisms 91, and attachments 71. Attachments 71 can include platform sensor system 93, platform power transfer system 95, and platform transceivers 97. UAV System 15 can include UAV sensor system 83, UAV power transfer 99, and UAV transceivers 101.

Figure 10:
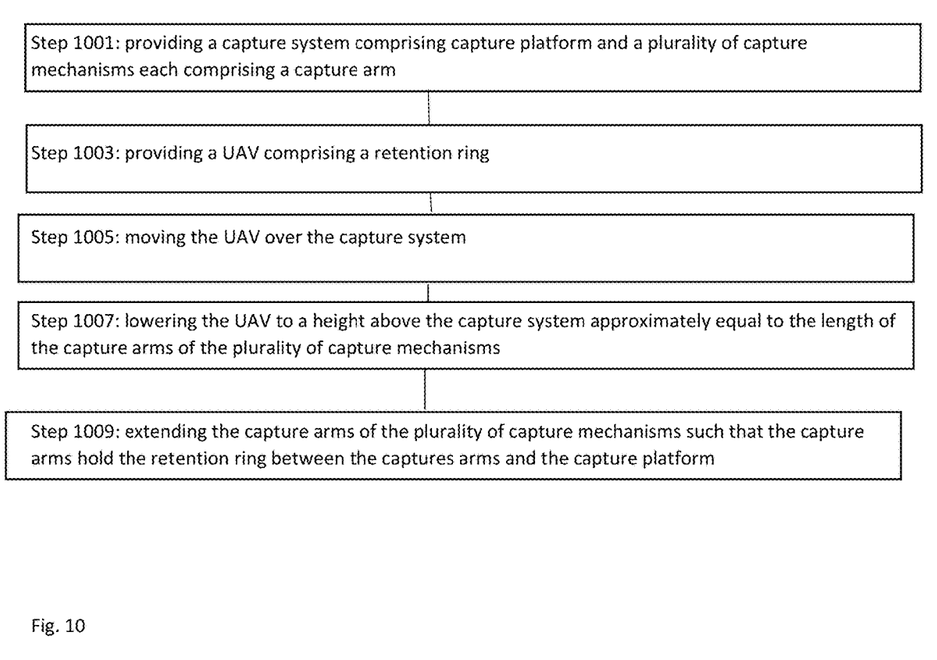
FIG. 10 shows an exemplary method for capturing UAVs.

FIG. 10 shows an exemplary method of capturing UAVs. At step 1001: providing a capture system comprising capture platform and a plurality of capture mechanisms each comprising a capture arm. At step 1003: providing a UAV comprising a retention ring. At step 1005: moving the UAV over the capture system. At step 1007: lowering the UAV to a height above the capture system approximately equal to the length of the capture arms of the plurality of capture mechanisms. At step 1009: extending the capture arms of the plurality of capture mechanisms such that the capture arms hold the retention ring between the captures arms and the capture platform Although the invention has been described in detail with reference to certain preferred embodiments, variations and modifications exist within the spirit and scope of the invention as described and defined in the following claims.

What is claimed:

1. A capture system comprising:
a landing platform;
a plurality of capture mechanisms each comprising:
an actuator configured to extend and retract the capture arm;
a mounting bracket that couples to the landing platform and the actuator; and
a capture arm coupled to a capture arm support by a first and a second pivot point, wherein each capture arm support of the plurality of capture mechanisms is formed with a track, wherein the first pivot point is disposed within the track such that the first pivot point moves along the track when the actuator extends and retracts the capture arm and each capture arm of the plurality of capture mechanisms is formed with a recess, wherein a shape of the recess is configured to match a retention ring
an Unmanned Aerial Vehicle (UAV) comprising the retention ring, wherein each capture arm of the plurality of capture mechanisms is configured to selectively couple to the retention ring.

2. The system of claim 1, further comprising a platform support, wherein the landing platform is coupled to the platform support.

3. The system of claim 2, wherein the platform support comprises an autonomous vehicle.

4. The system of claim 1, the landing platform comprising at least one conductive power transfer mechanism configured to transfer power to a coupled Unmanned Aerial Vehicle (UAV).

5. The system of claim 1, the landing platform comprising at least one sensor system configured to detect the presence of a Unmanned Aerial Vehicle (UAV), wherein each actuator of the plurality of capture mechanisms is configured to extend when the at least one sensor detects the presence of the UAV.

6. The system of claim 1, the landing platform comprising at least one antenna configured to communicate with an Unmanned Aerial Vehicle (UAV), wherein each actuator of the plurality of capture mechanisms is configured to extend when the at least one antenna receives a signal from the UAV.

7. A method of capturing unmanned aerial vehicles (UAV) comprising:
providing the capture system of claim 1;
providing a UAV comprising the retention ring;
moving the UAV over the capture system;
lowering the UAV to a height above the capture system approximately equal to the length of the capture arms of the plurality of capture mechanisms;

extending the capture arms of the plurality of capture mechanisms such that the capture arms contact the retention ring; and extending the capture arms of the plurality of capture mechanisms such that the capture arms hold the retention ring between the captures arms and the capture platform.

8. The system of claim 1, wherein the landing platform is a support pillar.

9. The system of claim 1, wherein the landing platform is a mobile, self driving platform.

10. The system of claim 1, wherein the landing platform is a nautical buoy.

11. A capture system comprising:
a landing platform;
a plurality of capture mechanisms each comprising:
an actuator configured to extend and retract the capture arm;
a mounting bracket that couples to the landing platform and the actuator; and
a capture arm coupled to a capture arm support by a first and a second pivot point, wherein each capture arm support of the plurality of capture mechanisms is formed with a track, wherein the first pivot point is disposed within the track such that the first pivot point moves along the track when the actuator extends and retracts the capture arm and each capture arm of the plurality of capture mechanisms is a hook;
an Unmanned Aerial Vehicle (UAV) comprising the retention ring, wherein each capture arm of the plurality of capture mechanisms is configured to hook onto the retention ring.

* * * * *